United States Patent [19]

Cottrell et al.

[11] 4,105,605

[45] Aug. 8, 1978

[54] SULFOMETHYLATED GRAFT COPOLYMERS OF XANTHAN GUM AND POLYACRYLAMIDE

[75] Inventors: Ian W. Cottrell, Solana Beach, Calif.; Richard A. Empey, Okmulgee, Okla.; Joseph S. Racciato, San Diego, Calif.

[73] Assignee: Merck & Co., Inc., Rahway, N.J.

[21] Appl. No.: 753,057

[22] Filed: Dec. 21, 1976

[51] Int. Cl.² ............................................. C08L 5/00
[52] U.S. Cl. ........................................... 260/17.4 GC
[58] Field of Search ............................... 260/17.4 GC

[56] References Cited

U.S. PATENT DOCUMENTS

| 2,730,505 | 1/1956 | Jordan | 252/311 |
| 3,020,207 | 2/1962 | Patton | 195/31 |
| 3,708,446 | 1/1973 | Pettitt | 260/17.4 GC |
| 3,770,673 | 11/1973 | Slagel et al. | 260/17.4 GC |

OTHER PUBLICATIONS

Industrial Eng. and Chem., vol. 48, 1956, pp. 2132–2137, Schiller et al.
"Starch: Chemistry and Technology," vol. II, Academic Press, 1967, pp. 445–449.

*Primary Examiner*—Edward M. Woodberry
*Attorney, Agent, or Firm*—Donald J. Perrella; Richard A. Thompson

[57] ABSTRACT

A water-soluble anionic graft copolymer of xanthan gum and polyacrylamide wherein at least part of the amide function is sulfomethylated.

10 Claims, No Drawings

SULFOMETHYLATED GRAFT COPOLYMERS OF XANTHAN GUM AND POLYACRYLAMIDE

BACKGROUND OF THE INVENTION

1. Field of the Invention

The present invention relates to a water-soluble anionic polymer and, more particularly, to a water-soluble anionic graft copolymer of xanthan gum and polyacrylamide wherein at least part of the amide function of the acrylamide portion of the copolymer is sulfomethylated and wherein the xanthan gum portion of the copolymer is substantially unreacted with formaldehyde.

2. Description of the Prior Art

Sulfomethylation of the amide function of polyacrylamide by means of formaldehyde and sodium bisulfite has been described by Schiller et al., Industrial and Engineering Chemistry, Vol. 48, 1956, pp. 2132–2137.

The preparation of a graft copolymer of xanthan gum and an acrylic monomer which may be acrylamide is described in U.S. Pat. No. 3,708,446 to Pettitt.

The use of formaldehyde to modify hydrophilic colloids such as xanthan gum, starch and guar gum is known. Formaldehyde-modified starch is described in an article by Hullinger in "Starch: Chemistry and Technology", Vol. II, Academic Press, 1967, pp. 445–449, while the use of formaldehyde to increase the viscosity of guar gum (increase in viscosity is due to cross-linking) is described in U.S. Pat. No. 2,730,505. Formaldehyde-modified xanthan gum is described in U.S. Pat. No. 3,020,207.

3. Objects of the Invention

It is an object of the present invention to provide a water-soluble anionic graft copolymer of xanthan gum and polyacrylamide. A further object is to provide a sulfomethylated graft copolymer of xanthan gum and polyacrylamide. Another object is to provide a method for preparing these graft copolymers. These and other objects of the present invention will be apparent from the following description.

SUMMARY OF THE INVENTION

A water-soluble sulfomethylated graft copolymer of xanthan gum and polyacrylamide is obtained by reacting a graft copolymer of xanthan gum and polyacrylamide with formaldehyde and sodium metabisulfite.

DETAILED DESCRIPTION

It has now been found that a graft copolymer of xanthan gum and acrylamide can be sulfomethylated by reacting the copolymer with formaldehyde and sodium metabisulfite. Surprisingly, it has been found that while the amide function of the acrylamide group is sulfomethylated, the formaldehyde does not cause any appreciable cross-linking between hydroxyl groups of the xanthan moieties. The sulfomethylation of the acrylamido group takes place at temperatures of from about 35° to about 70° C, preferably from about 40° to about 65° C for from about 1 to about 3 hours at elevated pH, preferably about pH 10 or higher, typically from about pH 12 to about pH 13. It has also been found that the degree of anionic character may be varied by adjusting the molar ratio of formaldehyde and sodium metabisulfite with respect to the graft copolymer. The molar ratio of sodium metabisulfite to formaldehyde may vary from about 1:1 to about 1:2. The amounts of sodium metabisulfite and formaldehyde are chosen so as to react with at least about 10% of the amide functions, and preferably from about 30% to about 100% of the amide functions. Typically, per 1 mole of polyacrylamide grafted to xanthan gum, the copolymer is reacted with from about 0.15 to about 0.5 mole of $Na_2S_2O_5$ and with from about 0.3 to about 1 mole of $CH_2O$, the mole ratio of $CH_2O$ being at least about equal to that of $Na_2S_2O_5$.

The preparation of a graft copolymer of xanthan gum and polyacrylamide is described in above-mentioned U.S. Pat. No. 3,708,446 to Pettitt. The weight ratio of xanthan gum to polyacrylamide in the graft copolymer may vary from about 3:1 to about 1 to 10, or expressed another way from about 1 part of xanthan gum to from about 0.3 to about 10 parts polyacrylamide. Preferably the weight ratio of xanthan gum to polyacrylamide in the graft copolymer is from about 2:1 to about 1:5, or expressed another way from about 1 part of xanthan gum to from about 0.5 to about 5 parts polyacrylamide.

Conversely, the weight ratio of polyacrylamide to xanthan gum in the graft copolymer may vary from about 10:1 to about 1:3, or expressed another way from about 1 part of polyacrylamide to from about 0.1 to about 3 parts xanthan gum. Preferably the weight ratio of polyacrylamide to xanthan gum in the graft copolymer is from about 5:1 to about 1:2, or expressed another way from about 1 part of polyacrylamide to from about 0.2 to about 3 parts xanthan gum. As described in that patent, the graft copolymerization reaction is conducted in an aqueous medium in which both the xanthan gum and the acrylamide are present. The aqueous medium can be the fermentation beer resulting from the preparation of the xanthan gum. The concentration of the xanthan gum generally ranges between about 1.0 and about 0.3% by weight of the water in the aqueous medium and it preferably ranges from about 2.0 to about 2.5% by weight of the water. The concentration of the acrylic monomer may range from as low as 0.5% to as high as 20% by weight of the water. Preferably, the concentration of the monomer is in the range of about 2.0 to about 10.0% by weight and more preferably from about 3 to about 6% by weight of the water in the aqueous medium.

Before addition of the ceric catalyst to the aqueous reaction medium, the medium is first purged with an inert gas such as nitrogen, argon, krypton, helium or the like to remove oxygen. If desired, the reaction system can first be evacuated prior to introduction of the inert gas or, conversely, the inert gas can be swept over the reaction medium to purge the system of oxygen. Following the removal of oxygen from the reaction system, the ceric catalyst is added. The ceric catalyst can be any ceric salt which is soluble in the acid corresponding to the acid anion present in the salt. Thus, for example, the ceric catalyst may be ceric nitrate, ceric sulfate, ceric chloride, or ceric perchlorate. The ceric salt is dissolved in the acid corresponding to the acid anion in the salt prior to its addition to the reaction medium. Thus, the ceric nitrate or ceric ammonium nitrate salt would be first dissolved in nitric acid; the ceric sulfate salt would be dissolved in sulfuric acid; the ceric chloride salt would be dissolved in hydrochloric acid, and the ceric perchlorate salt would be dissolved in perchloric acid. The ceric salt is present in the reaction medium at a concentration which is effective to cause copolymerization of the xanthan gum with the acrylic monomer. By way of example, the concentration of the ceric salt in the reaction medium may range from about 0.05% to about 0.5% by weight and preferably from about 0.11 to about 0.33% by weight.

The pH of the reaction medium is controlled within the range from about 2 to about 5 by the addition of nitric, hydrochloric, sulfuric, or perchloric acid as outlined previously. The particular acid employed corresponds to the acidic anion present in the ceric salt. The weight ratio of the xanthan gum to the acrylic monomer used in the copolymerization reaction may be varied depending upon the properties desired in the graft copolymer product. In general, the weight ratio of xanthan gum to acrylic monomer can range from about 3:1 to about 1:10, preferably from about 2:1 to about 1:5.

The copolymerization reaction may be conducted at a reaction temperature ranging from about 0° to about 60° C, and preferably about 20° to about 30° C. The reaction is generally initiated at about room temperature. The time required for the reaction may vary but is generally in the order of about 2 to about 3 hours. During the course of the reaction, the reaction medium becomes more viscous. Thus, the consistency of the reaction medium may be used as a criteria for determining the degree of completion of the reaction. When the reaction is completed, the pH is adjusted to about 5–8 and preferably about 7 by the addition of a suitable base such as sodium hydroxide, sodium bicarbonate, sodium carbonate, a sodium phosphate, the corresponding potassium salt of any of the foregoing, or ammonia. Also, if desired, a free radical inhibitor such as p-methoxyphenol. N,N'-di-sec-butyl-p-phenylenediamine, butylated hydroxytoluene, butylated hydroxyanisole or sodium bisulfite may be added.

Following this, the product may be separated from the reaction medium by precipitation through addition of a lower alcohol or ketone, and then dried in any suitable manner, such as by gentle heating.

The sulfomethylated graft copolymer of xanthan gum and polyacrylamide of the present invention is useful as an anti-migrant for textile dyeing applications.

Surprisingly, it has been found that in the process of the present invention sulfomethylation occurs substantially exclusively on the polyacrylamide portion of the graft molecule and that the formaldehyde does not react with the xanthan gum portion of the graft molecule as is shown by the following infrared absorption data:

| Xanthan gum | Formaldehyde Treated Xanthan gum | Sulfomethylated Graft Copolymer of Xanthan Gum & Polyacrylamide |
|---|---|---|
| Microns | Microns | Microns |
| 3.0 | 3.0 | 3.0 |
| 3.4 | 3.4 | 3.4 |
| 5.8 | 5.8 | — |
| 6.2 | 6.2 | 6.2 |
| 7.1 | 7.1 | 6.4 |
| 7.3 | 7.3 | 7.1 |
| 8.1 | 8.1 | 8.1 |
| 8.6–10.2 | 8.6–10.2 | 10.2 |
| — | 10.8 | — |
| 11.3 | — | — |
| 12.4 | 12.3–12.6 | — |
| 13.9 | — | — |
| — | — | 16.0 |
| — | — | 20.2 |

Since xanthan gum treated with formaldehyde contains an absorption peak at 10.8 microns and untreated xanthan gum does not, this peak must be characteristic of the reaction with formaldehyde. As the infrared spectrum of the sulfomethylated graft copolymer does not contain this absorption peak, reaction of the xanthan gum portion of the graft with formaldehyde has not occurred.

The following examples illustrate the present invention without, however, limiting the same thereto. All parts and percentages are by weight, unless otherwise indicated.

EXAMPLE 1

A graft copolymer is prepared by reacting equal parts by weight of xanthan gum and acrylamide according to the procedure of Example 1 of U.S. Pat. No. 3,708,446. The resulting copolymer (1.44 g, 0.005 mole) is dissolved in 100 ml distilled water in a three neck, round bottom flask (250 ml) fitted with a thermometer, stirrer and reflux condenser. To this solution is added 0.95 g $Na_2S_2O_5$ (0.005 mole), 0.80 g 50% NaOH (0.01 mole), and 0.81 g 37% $CH_2O$ (0.01 mole). The solution is heated to 50° and stirred at this temperature for 3 hours. At the end of this period, the mixture is cooled to room temperature (~22°), neutralized to about pH 7 with dilute acid, and the reaction product recovered by addition of the solution to 2 volumes of isopropanol. The product is dried in vacuo at 40° and milled through a 60 mesh (U.S. standard) screen. The results of this experiment are shown in the following table:

| | |
|---|---|
| Yield, g | 2.13 |
| Theoretical Yield, g | 2.58 |
| % Yield | 82.6 |
| % Amide Groups Reacted | 75.9 |
| 1% Viscosity, cps | 90 |
| 1% KCl Viscosity, cps | 87 |

EXAMPLES 2 AND 3

The procedure of Example 1 is repeated except that in Example 2, the mole ratio of graft copolymer (moles based on polyacrylamide) to reactants ($Na_2S_2O_5$ and $CH_2O$) is 2:1 while in Example 3, the mole ratio of graft copolymer to reactants is 1:1. The results of these examples are shown in the following table:

| Example | 2 | 3 |
|---|---|---|
| Yield, g | 18.11 | 26.08 |
| Theoretical Yield, g | 25.8 | 25.8 |
| % Yield | 70.2 | 101.1 |
| % Amide Groups Reacted | 58.9 | 100 |
| 1% Viscosity, cps | 335 | 125 |
| 1% KCl Viscosity, cps | 230 | 90 |

Each of the anionic polymers of Examples 2 and 3 is pseudoplastic, has good high temperature stability, and is stable between pH 6 and 11. The polymers also exhibit a synergistic viscosity effect with guar gum.

EXAMPLE 4

The procedure of Example 1 is repeated except using a mole ratio of graft copolymer (moles based on polyacrylamide) to reactants ($Na_2S_2O_5$, NaOH and $CH_2O$) is 1:1.25. The following results are obtained:

| | |
|---|---|
| Yield | 29.5 g |
| Theoretical yield | 25.8 g |
| % Yield | 114.3 |
| % Amide groups reacted | 100 |
| 1% viscosity, cps | Partially insoluble |

| -continued | |
|---|---|
| 1% KCl viscosity, cps | 20 |

This shows the undesirable results obtained the mole ratio of graft copolymer to $Na_2S_2O_5$ and $CH_2O$ exceeds about 1:1.

EXAMPLE 5

A graft copolymer is prepared by reacting 1 mole of xanthan gum and 3 moles of acrylamide according to the procedure of Example 1 of U.S. Pat. No. 3,708,446. A portion of the resulting copolymer, 0.005 mole, is sulfomethylated as described in Example 1. The sulfomethylated product is then evaluated as an antimigrant using a low viscosity sodium alginate (Kelco KNRL ®) as control. The evaluations are run on 100% woven polyester fabric using dispersible dyes. The antimigrant is tested in the following formulation:

| Antimigrant | X % |
|---|---|
| Disperse dye (Eastman polyester blue BGL) | 1.2 % % |
| Wetting Agent (Tergitol 1559) | 0.05% |
| Water | to 100 % |

(where X is 1%, 3%, 5%, & 7%)

The foregoing formulations are padded onto the fabric and evaluated using AATCC Test Method 140-1974, "Evaluation of Dyestuff Migration." The test results in Gray Scale Evaluation of Change In Color ratings are presented below.

| | % Antimigrant | | | |
|---|---|---|---|---|
| | 1% | 3% | 5% | 7% |
| Sulfomethylated Copolymer | 4 | 4-5 | 5 | 5 |
| Low viscosity sodium alginate | 3-4 | 4 | 4-5 | 5 |

The ratings go from 1 to 5 with 5 being the best, while a hyphenated reading means a value above the lower reading and below the higher reading, e.g., 3-4 means a value above 3 but below 4.

What is claimed is:

1. A water-soluble graft copolymer of xanthan gum and polyacrylamide containing from about 1 part by weight of xanthan gum to from about 0.3 to about 10 parts by weight of polyacrylamide wherein at least about 10% of the amide functions of the polyacrylamide portion of the copolymer are sulfomethylated.

2. A graft copolymer according to claim 1 wherein from about 30% to about 100% of the amide functions are sulfomethylated.

3. A graft copolymer according to claim 1 which contains from about 1 part of xanthan gum to from about 0.5 to about 5 parts polyacrylamide.

4. A graft copolymer according to claim 3 wherein from about 30% to about 100% of the amide functions are sulfomethylated.

5. A water-soluble graft copolymer containing from about 1 part by weight of polyacrylamide to from about 0.1 to about 3 parts by weight of xanthan gum wherein at least about 10% of the amide functions of the polyacrylamide portion of the copolymer are sulfomethylated.

6. A graft copolymer according to claim 5 wherein from about 30% to about 100% of the amide functions are sulfomethylated.

7. A graft copolymer according to claim 5 which contains from about 1 part by weight of polyacrylamide to from about 0.2 to about 3 parts xanthan gum.

8. A graft copolymer according to claim 7 wherein from about 30% to about 100% of the amide functions are sulfomethylated.

9. An antimigrant composition consisting essentially of an aqueous medium containing from about 0.5% to about 10% by weight of a copolymer according to claim 1.

10. An antimigrant composition consisting essentially of an aqueous medium containing from about 0.5% to about 10% by weight of a copolymer according to claim 5.

* * * * *